Patented Jan. 19, 1932

1,841,825

UNITED STATES PATENT OFFICE

HEINRICH KRIEGSHEIM, OF NEW YORK, N. Y., ASSIGNOR TO THE PERMUTIT COMPANY, OF NEW YORK, N. Y., A CORPORATION OF DELAWARE

BOILER OPERATION

No Drawing. Application filed December 16, 1929. Serial No. 414,576.

This invention relates to boiler operation; and it comprises a method of boiler operation wherein sodium phosphate and sodium phosphite are contained in all water coming into contact with hot metal; sodium carbonate alkalinity in softened water used in supplying the boiler being obviated, in whole or in part, and free oxygen in such water being taken up, by addition to such water of an acid solution containing phosphorous acid, thereby forming phosphites and phosphates which go forward to the boiler; all as more fully hereinafter set forth and as claimed.

In modern high power, high rate boiler plants, a multiplicity of considerations must be taken into account in securing satisfactory operation. Among these considerations is that of the amount and nature of the salines present in the boiler. While scaling cannot be permitted, the presence of non-scaling salines is inevitable and, in some amount, is desirable. As I have pointed out in a prior Patent, No. 1,235,815, of August 7, 1917, certain salines in certain amounts are desirable in water, not only in the boiler but in feed water heaters and other accessories as lessening corrosion.

In large scale power plants using condensation, most of the water in the system is in cyclic circulation; water from the condensers going back to the boiler. Usually, something like 95 per cent of the water delivered as steam can be condensed and reclaimed and sent back to the boiler, leaving only 5 per cent of make-up water to be supplied. Part of this make-up water is generally afforded by raw water gaining access to the condensed water by leakages in the condensing system. The rest of the make-up water may be supplied (1) as distilled water coming from an evaporator; (2) as artificially softened water coming from a lime-soda plant, a lime-barium plant or a zeolite softener; or (3) directly from a raw water supply. Raw water or incompletely softened water may introduce scale-forming solids into the boiler. In this event, it is the custom to add to the feed water various sodium compounds such as carbonate, hydroxid or phosphate. These bodies precipitate lime and mangesia in a form which does not form adherent scale. The presence of these sodium salts in the boiler water also aids in preventing corrosion due to the high hydrogen ion concentration in pure water at high temperatures and in counteracting the effect of oxygen dissolved in the feed water.

In the boiler, the salines brought in by the make-up water accumulate and the saline concentration builds up. Blowing off water from the boiler is necessary from time to time to reduce this saline concentration. As pointed out in said prior patent, the saline concentration in the water in the boiler should however not be reduced beyond a certain point. It is advantageous to have some saline matter in solution in all hot water in contact with metal. In the patent, sodium carbonate and sodium phosphate are pointed out as two salts advantageous in this relation and later experience has shown that phosphate in addition to its value in tending to inhibit corrosion also inhibits reactions of the water or of the alkali in the water with the iron at high temperature. It is generally assumed that phosphate compositions favor the formation of impervious protecting films upon the iron. As it is difficult to prevent completely the presence of some free oxygen in water going to the boiler, this property of phosphates is advantageous.

Experimental results have been published stating that the hydrogen ion concentration of pure distilled water, which may be taken as $10^{-7}$ gram per liter, that is a pH of 7, on heating to 200° C. becomes approximately $10^{-5.7}$ gram per liter, that is a pH of 5.7. It is presumed that alkaline salts limit corrosion in the boiler by reducing the hydrogen ion concentration.

Practically all artificially softened waters take sodium carbonate into the boiler and sodium carbonate hydrolyzes to a greater or less extent according to the temperature, producing $CO_2$ which goes off with the steam and leaving NaOH. The net result of the action is the presence of some NaOH in the boiler. For various reasons, large amounts of NaOH are not considered desirable in a boiler; and particularly in defective boilers having badly made seams. It is believed by some that NaOH when highly concentrated in cracks or crevices may attack or embrittle metal under high stress.

Artifically softened waters may also take sodium sulfate into the boiler and this, as a neutral, non-hydrolyzing salt, is believed by some to counteract the embrittling effect which highly concentrated NaOH may have. Some of the carbonates in the make-up water are therefore sometimes converted into sulfates by addition of sulfuric acid to the make-up water. For various reasons, however, I believe phosphates more desirable than sulfates and in the present invention I produce phosphates in the boiler water.

Steam condensing plants are mostly operated under vacuum and the condensed water coming from the condenser is almost free from oxygen. However, as the condensate generally must be stored for some time, it then has an opportunity to take up oxygen from the air, which it does very quickly. In addition, the make-up water from whatever source it may come, even distilled water if it has been stored, contains dissolved oxygen, which ought to be removed before the water can be fed to the boiler or goes through pre-heaters.

In the present invention, I have developed a means of obviating the noted difficulties in the operation of a boiler. In this operation, the make-up water is neutralized with phosphorous acid, thereby converting sodium carbonate into phosphite. In the boiler sodium phosphite not only operates like any other neutral saline in inhibiting corrosion, but it has a positive value in this direction, because of its reducing nature. Further, it takes up oxygen which may be present in the water, going to or in the boiler, with formation of phosphate; a valuable substance in the boiler. In a system such as that of my acknowledged prior Patent, No. 1,235,815, where some portion of the boiler salines is recirculated through feed water heaters, together with condensed water, the saline body soon becomes mostly phosphate with some phosphite.

The phosphorous acid used may be made in any suitable way, as by the slow oxidation of phosphorous with limited amounts of moist air or by the hydrolysis of $PCl_3$. A cheap method of making a technical preparation is to reduce tricalcium phosphate (bone phosphate) with carbon to produce the corresponding phosphid. This may be done in a crucible or in an electric furnace. The granulated phophid is subjected to slow oxidation by a current of air containing some moisture; oxidation being best at a temperature around 100° C. The action of moisture on phosphid is to furnish phosphine, $PH_3$, and phosphine is oxidized by air to phosphorous acid. By a regulated action of both air and moisture on the calcium phosphid, the phosphorous acid is taken up by the lime and calcium phosphite is formed. Practically speaking, the calcium phosphid is directly converted into calcium phosphite. The calcium phosphite taken up by water and treated with the calculated amount of sulfuric acid gives a technically pure solution of phosphorous acid, which is removed from the calcium sulfate formed in any suitable manner. Sodium phosphite may be made from dissolved calcium phosphite with the aid of $Na_2CO_3$; and this sodium phosphite added to the feed water. However, generally I find it desirable to use phosphorous acid, relying on soda in the water to form sodium phosphite.

Phosphorous acid solutions may be produced in other ways, as by limited oxidation of phosphorus by air and steam, by hydrolysis of $PCl_3$, etc., but the stated method of manufacture is cheap and advantageous.

Any of these preparations may contain more or less phosphoric acid but this is immaterial for the present purposes. Phosphorous acid, in any event, is expected to change to phosphoric acid in time. However formed, the acid preparation is added to the softened or raw water, as the case may be, in sufficient amounts to take care of scale-forming bodies present and to decompose sodium carbonate; either or both. The saline concentration in the boiler is maintained by balancing the additions of phosphite and the removal of salines by blowing down, so as to maintain in the boiler a certain concentration of phosphates plus phosphites, say, 1, 2 or more grains per gallon. Considerably higher concentrations are permissible. It is desirable that the phosphite occur in the condensed water going through the feed heaters; and in general in any water which has been exposed to air prior to contact with hot metal surfaces.

While I have described my invention more particularly as applied to a condensing steam plant, it is obvious that it is equally useful in other steam plants. Where all the water going to the boiler is softened water, it is useful to obviate the sodium carbonate alkalinity with an acid preparation containing phosphorous acid in the same way as just described for make-up water. In condensing plants, where the amount of make-up water is small, it is sometimes useful to supply the circulating water with specially made saline preparations formed by neutralizing the described acid liquid with soda, either as soda ash or as caustic soda.

The particular concentration of salines employed in the boiler itself may vary between rather wide limits. In general, it is desirable to have about 20 to 50 milligrams $PO_4$ in each liter of the boiler liquid; 20 to 50 parts per million. The concentration may, however, be higher, but I desire to maintain a comparatively low amount of sodium carbonate in the boiler, i. e., only sufficient to maintain an alkaline reaction. The particular ratio between sodium phosphate and phosphite is not very material so long as there is sufficient phosphite to take care of oxygen going into the water and to produce protecting films in the boiler. It is quite undesirable to have dissolved oxygen in the water going through the economizer and in the boiler, therefore the phosphite necessary to take up such oxygen should usually be added before heating the water in the economizer. If necessary, boiler salines can be circulated through the economizers and heaters as in my prior patent.

In the event that considerable raw water gains access to the boiler through leakage or otherwise, the phosphite of the present invention is an efficient agent in preventing scaling, forming calcium phosphites and phosphates as a non-adherent sludge, as well as giving protective films. In this case, caustic soda or $Na_2CO_3$ may be added to the water for the precipitation of the hardness forming constituents before the phosphorous acid is added in order to save in cost. The precipitated $CaCO_3$ may be filtered out before the water enters the boiler again or the boiler salines may be filtered before they are circulated.

What I claim is:—

1. In the treatment of boiler water, the process which comprises adding to such a water an acid preparation containing phosphorous acid.

2. In operating steam boilers for production of steam for steam engine or other use, a method of minimizing corrosion and scale formation in boilers and boiler accessories which comprises maintaining in the boiler water a substantial concentration of sodium phosphite together with other corrosion-preventing salines.

3. In operating steam boilers for production of steam for steam engine or other use, a method of minimizing corrosion and scale formation in boilers and boiler accessories which comprises supplying phosphite to the boiler water contacting with heater metal parts of a boiler and of boiler accessories.

4. In minimizing corrosion in boilers and boiler accessories utilizing water containing sodium carbonate, the process which comprises adding phosphorous acid to such water.

5. A method of protecting steam boilers and boiler accessories against damage resulting from relatively high concentrations of alkali in the boiler feed water which comprises converting a portion of said alkali into alkali phosphite.

In testimony whereof, I have hereunto affixed my signature.

HEINRICH KRIEGSHEIM.